United States Patent [19]
Löhr et al.

[11] 3,884,135
[45] May 20, 1975

[54] COOKING APPLIANCE

[75] Inventors: Alfred Löhr, Bochum; Wolfgang Tschek, Westerholt; Heinz Förster, Gelsenkirchen-Buer; Bernhard Klauk, Gelsenkirchen; Wolfgang Schwan, Gelsenkirchen-Erle, all of Germany

[73] Assignee: F. Kuppersbusch & Sohne Aktiengesellschaft, Gelsenkirchen, Germany

[22] Filed: June 9, 1972

[21] Appl. No.: 261,338

[30] Foreign Application Priority Data
June 9, 1971 Germany............................ 2128686
Oct. 16, 1971 Germany............................ 2151576
Jan. 12, 1972 Germany............................ 2201200

[52] U.S. Cl. ...................... 99/348; 165/94; 259/43; 259/108
[51] Int. Cl. .......................... B01f 7/18; B01f 15/06
[58] Field of Search ............ 99/348, 339, 340, 287, 99/357; 259/108, DIG. 39, DIG. 45, DIG. 35, 43; 241/46.11, 46.17; 165/94; 15/246.5

[56] References Cited
UNITED STATES PATENTS

| 955,616 | 4/1910 | Tava | 259/108 |
|---|---|---|---|
| 1,657,524 | 1/1928 | Camp | 259/108 |
| 1,958,409 | 5/1934 | Kohler | 99/348 |
| 2,012,981 | 9/1935 | Wilsey | 99/348 |
| 2,573,837 | 11/1951 | Fox | 259/108 |
| 2,586,347 | 2/1952 | Kloster | 99/348 |
| 3,329,348 | 7/1967 | Pootmans | 259/108 |

FOREIGN PATENTS OR APPLICATIONS

| 135,189 | 11/1929 | Switzerland | 99/348 |
|---|---|---|---|
| 829,018 | 1960 | United Kingdom | 259/108 |

OTHER PUBLICATIONS
Groen Mfg. Co., Aug. 1966, pps. 1–6.

Primary Examiner—Donald E. Watkins
Assistant Examiner—Stuart S. Levy
Attorney, Agent, or Firm—Spencer & Kaye

[57] ABSTRACT

An improved cooking appliance which includes a heated cooker for holding the ingredients to be cooked, a scraper for stirring the ingredients within the cooker and for scraping the bottom surface of the cooker and a drive for the scraper.

10 Claims, 14 Drawing Figures

COOKING APPLIANCE

BACKGROUND OF THE INVENTION

The present invention relates to a cooking appliance, and more particularly to a large size cooking appliance including a heated cooker for holding the ingredients to be cooked and a driven stirring element for stirring the ingredients to be cooked.

Such large-size cookers with stirring elements for stirring the ingredients to be cooked are known. The ingredients to be cooked are stirred primarily to mix them as well as to prevent the formation of a skin on the surface of the ingredient mixture. For cooking ingredients containing a large proportion of liquid, a stirring element can to some extent reduce the danger of burning of the ingredients when circumstances are otherwise favorable. However, in the case of foods which tend to burn easily, such as goulash, sauces and the like, a stirring element of the conventional type cannot prevent burning of the food at the bottom of the cooker. As a result the taste of the food is impaired. Also, the subsequent removal of the burnt food from the bottom of the cooker is difficult and time consuming.

SUMMARY OF THE INVENTION

It is, therefore, an object of the present invention to dependably and substantially eliminate sticking and subsequent burning of the ingredients to be cooked on the bottom surface of the cooker.

This as well as other objects are accomplished according to the present invention by the provision of a stirring element which is constructed as a scraper which slides across the bottom of the cooker.

The present invention thus has the advantage that during rotation of the scraper the heated bottom surface of the cooker is continuously subjected to a scraping action so that sticking as well as subsequent burning of the ingredients to be cooked is substantially eliminated.

Heating of the cooker may, under certain circumstances, cause an undesirable deformation of the bottom surface of the cooker. The large quantities of food required in large kitchens, for example, require economical cookers with very large diameters. Accordingly, the length of the scraper must be adapted to the respective diameter of the cooker. The scraper must moreover be so arranged that the scraping can take place in the cookers, which are made predominantly of chromium-nickel steel, on the bottom surface of the cooker without wear and without the formation of chips. A uniform scraping process is a prerequisite in spite of the noted difficult operating conditions due to the deformation of the bottom surface of the cooker during heating. Particularly for very large cookers and thus large scraper dimensions, a deformation of the cooker bottom surface may produce unfavorable operating conditions which result in objectionable wear of the scraper and of the bottom surface of the cooker. This can enhance the occurrence of vibrations at the scraper and also jamming of the scraper.

It may also happen that the entire scraping device becomes blocked when small particles of the area to be scraped or of the ingredients to be cooked in the cooker, for example, pieces of bone or meat, jam in the generally undesired gaps defined between the scraper and the bottom surface of the cooker, and in particular in the transition area defined by the perpendicular cooker walls, the bottom surface of the cooker and the scraper.

In order to assure careful treatment of the cooker bottom even though unevenness of the bottom surface may occur, an advantageous further embodiment of the present invention proposes to dispose the scraper on a supporting arm. This measure results in the advantage that the scraper itself can be made of a substantially thinner material than the supporting arm since it performs only the scraping function while the forces required for stirring or turning the ingredients are substantially produced by the stronger supporting arm.

According to a further development of the present invention it is advisable to make the scraper resilient. This affords the advantage that the scraper can easily overcome any unevennesses it encounters during rotation relative to the bottom surface of the cooker while at the same time not scraping the bottom surface.

A further advisable embodiment of the present invention provides that the scraper be disposed on the supporting arm so that it can be adjusted in height. In this way it is possible to arbitrarily adjust the distance of the scraper from the bottom surface of the cooker and thus set the scraper to meet the particular operating requirements at hand.

Another and particularly advisable embodiment of the present invention provides for the supporting arm and the scraper to be guided on the bottom surface of the cooker by means of supporting elements. This affords the advantage that the supporting arm and thus the scraper can automatically adapt itself to the respective condition of the bottom surface of the cooker.

Acceptable operation of the scraper, however, also requires that it scrape over the heated bottom surface of the cooker while extending in a continuous straight line along its longitudinal axis. At the beginning of the scraping operation a temperature maximum exists at the scraper edge in contact with the heated bottom surface, while a temperature minimum exists at the edge opposite the scraping edge. The temperature drop between these two edges of the scraper may be more than 100°C so that a substantial internal stress is developed within the scraper. The internal stresses developed in the scraper are compensated for, however, by a deformation of the scraper which has a wall thickness of about 0.4 to 0.6 mm. A deformation (warping) of the scraper, particularly in the area of the scraping edge generally leads to operational problems, i.e. the scraping process is interrupted and the drive for the scraper may be blocked.

In order to prevent deformation or warping of the scraper, an advantageous further embodiment of the present invention proposes mounting the scraper thermoelastically on the supporting arm. The advantages obtained therewith are mainly that the scraper can expand without it warping.

DESCRIPTION OF THE PREFERRED EMBODIMENTS

Figure 1:
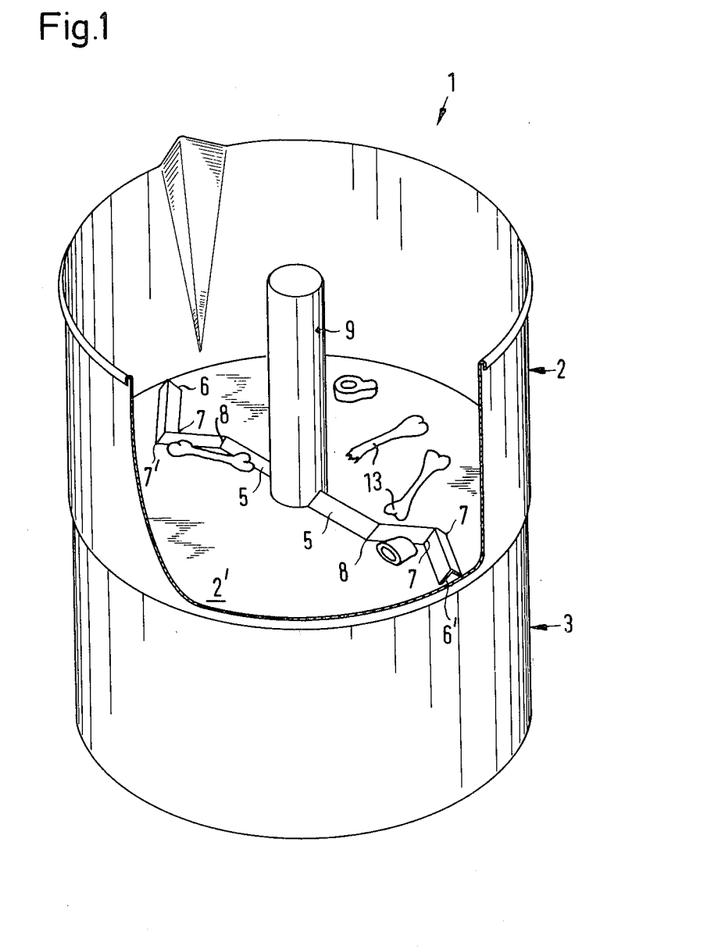
FIG. 1 is a schematic perspective illustration of a cooking appliance according to the present invention with the cooker partially cut away.
Figure 2:
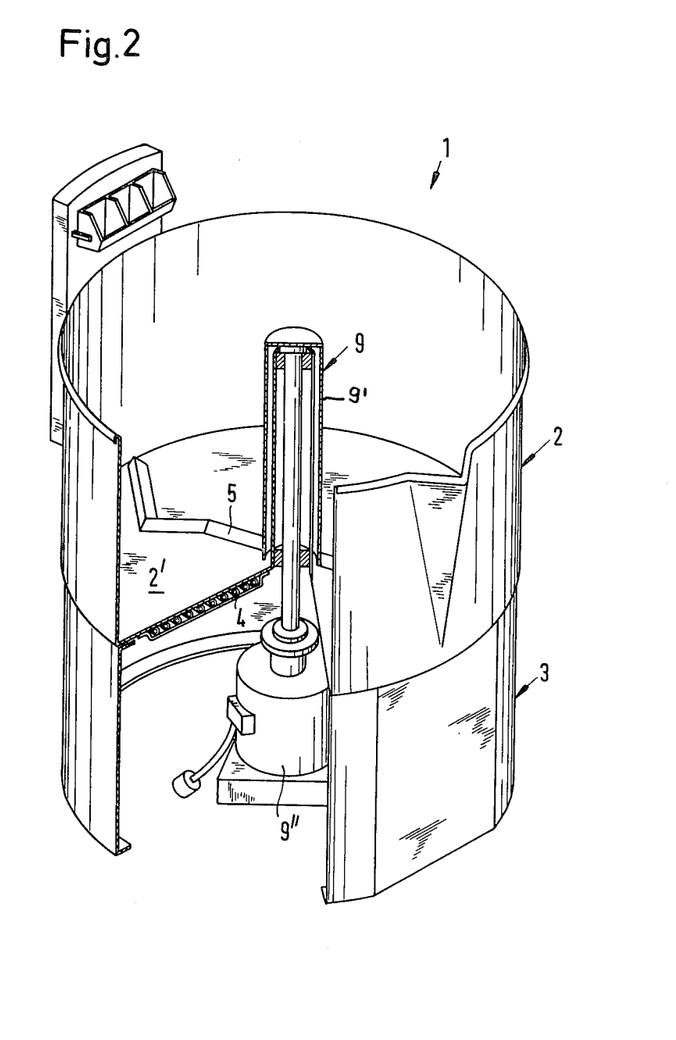
FIG. 2 is a schematic perspective illustration of a cooking appliance according to the present invention with the cooker and the base therefore partially cut away.
Figure 3:
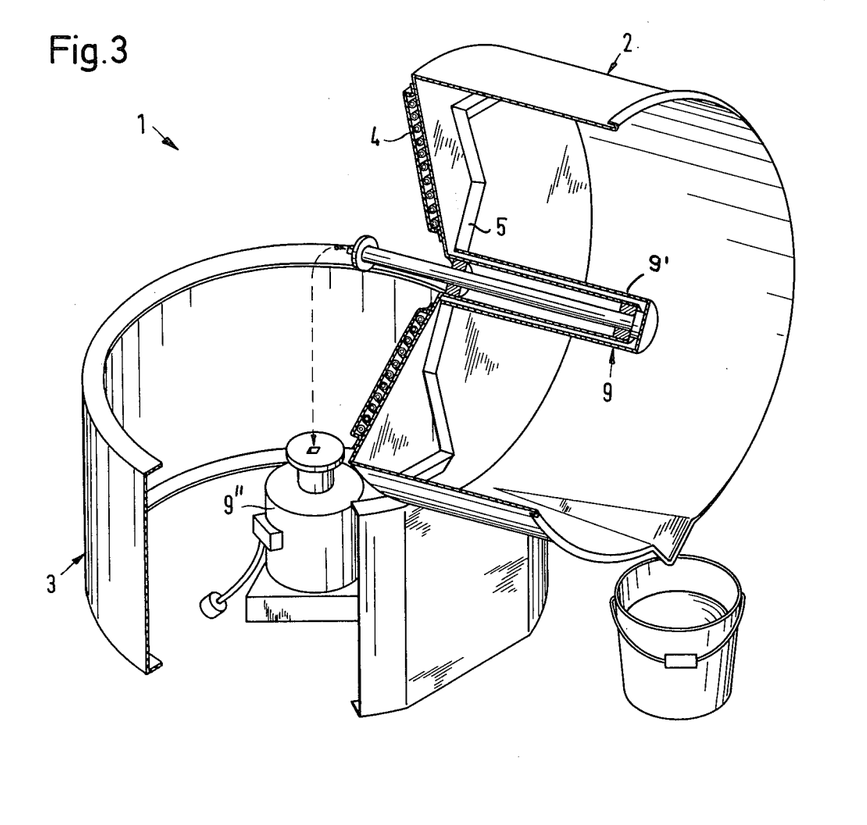
FIG. 3 illustrates the cooking appliance of FIG. 2 in a tilted position.

The large-size cooking appliance 1 shown in FIGS. 1 to 3 of the present invention serves mainly for the preparation of food in the form of roasts, fried or sauce products, etc. It should be understood, however, that the present invention can be utilized with equal effectiveness where ingredients other than food are to be cooked and stirred, where it is desirable to prevent burning of the ingredients during cooking. The large-size cooking appliance 1 comprises a cooking vessel or cooker 2 and a base 3 on which the cooker 2 is mounted. As shown in FIG. 3, the cooker 2 is mounted to be tilted with respect to the base 3. Below the bottom surface 2' of the cooker 2, a heating device 4 is provided. The heating device 4 is provided preferably in the form of coils. Of course it should be understood that other means of heating the surface 2' can be utilized with equal effectiveness as the coils 4. A scraper 5 is mounted within the cooker 2 such that it slides over the bottom surface 2' of the cooker 2 in a scraping manner. The scraper 5 is driven by means of a drive post member 9 centrically protruding from the bottom surface 2'. The post member 9 is coupled to a drive 9" which includes a reduction gearing. The drive 9" is accommodated within the base 3. The scraper 5 is preferably attached, for example, by welding, to the outer cyclinder 9' of the post member 9.

The scraper 5 serves two purposes, namely, it serves to stir the food 12 and to prevent food from sticking to the bottom surface 2' of the cooker 2.

The scraper 5 comprises two rotating oppositely disposed laterally extending arms 6, 6'. Each arm is designed to be bent twice over its length. The bent portion 7, which is furtherest removed from the center of rotation, forms an acute angle, while the bent portion 8, which is radially inboard of the bent portion 7, forms an obtuse angle. Stated differently, each arm has a first arm portion, a second arm portion adjoining end-to-end the first arm portion at an obtuse angle and a third arm portion adjoining end-to-end the second arm portion at an acute angle. The bent portion 7 is directed with the apex of its angle 7' in the direction of rotation of the scraper 5. Thus, the acute angle formed by the bent portions 7 opens in the direction opposite to the direction of rotation of the scraper 5, while the obtuse angle formed by the bent portions 8 opens in the direction of rotation of the scraper 5.

Rotation of the scraper 5, where it is of advantage not to have it rotate in synchronism, develops the scraping movement of the scraper over the bottom surface 2' of the cooker 2, while the bent portions 7 and 8 cause the food within the cooker 2 to be stirred. The scraping movement prevents sticking of the food to the boom surface 2'.

The scraper 5 advantageously does not rotate in synchronism in that its speed is caused to vary in a cyclic manner. Thus, drive 9" may be arranged to rotate scraper 5 at a slow speed for a few minutes and at a higher speed for a few minutes, continuously repeating this cycle. This alternating speed will favorably influence the scraping effect and the mixing and turning of the food.

Figure 4:
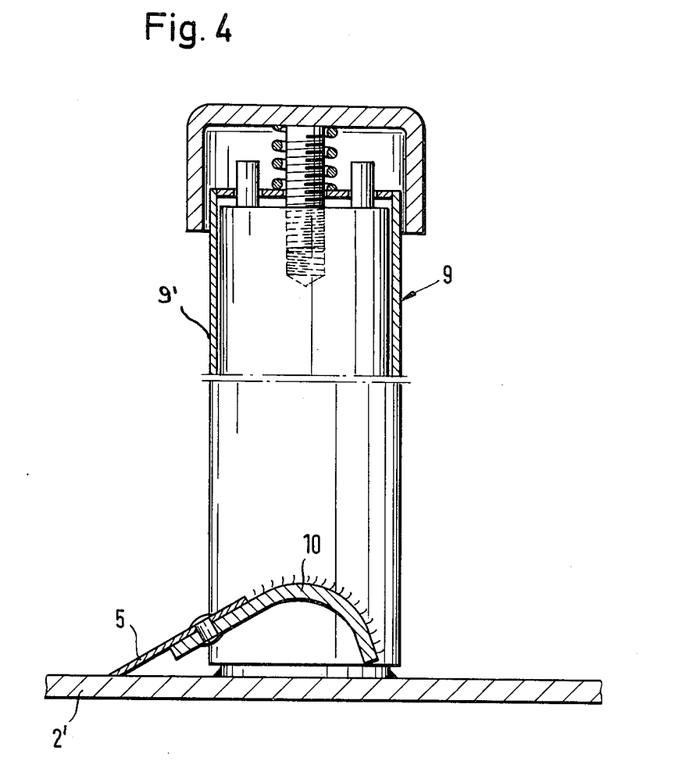
FIG. 4 is a view in elevation illustrating in cross section the scraper mounted to a supporting arm, and partly in cross section a driving post for the mounted scraper.

According to another preferred embodiment of the present invention, it is advisable to mount the scraper 5 on a supporting arm 10 which is itself mounted for rotation in the bottom area of the cooker 2. That is, one end of the supporting arm 10 is attached, for example, by welding to the outer cylinder 9' of the post member 9, as shown in FIG. 4. In this way it is possible to select a much thinner material for the scraper 5 since the main forces necessary for the processes of scraping and stirring are generated by the supporting arm.

In those embodiments in which scraper 5 is mounted on a supporting arm, the scraper-supporting arm assembly may be provided with bent portions such as 7 and 8 of FIGS. 1-3, but this is not necessary to their satisfactory operation.

It is particularly advantageous to construct the scraper 5 to be resilient. Nonrusting spring steel is particularly suited as the material for such a scraper. However, it is also possible to utilize an appropriate synthetic material for the scraper.

Figure 5:
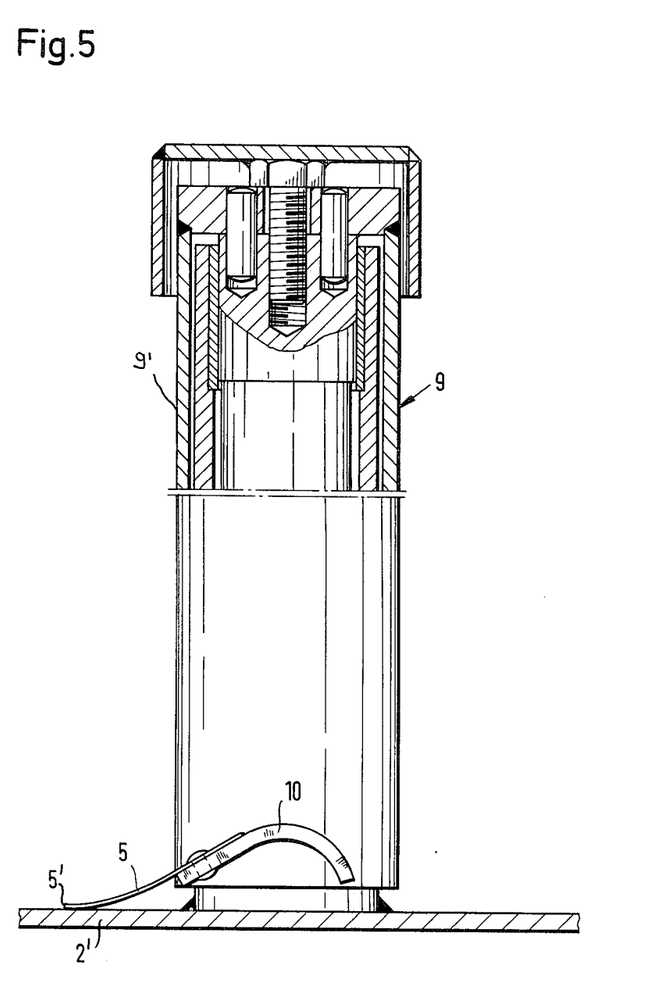
FIG. 5 is a view in elevation illustrating one embodiment of the scraper mounted to a supporting arm, and partly in cross section another embodiment of the driving post for the mounted scraper.

As shown in FIG. 5, the scraper 5 is designed to be slightly curved in the contact area with the bottom surface 2' of the cooker 2. The scraper 5 so designed contacts the bottom surface 2' with the underside of the curved surface 5'. The flexible arrangement of the scraper 5 according to this embodiment has the particular advantage that the resulting scraper 5, 5' easily passes during rotation over any unevennesses existing in the bottom surface 2' of the cooker 2, and does not scrape off any of the surface 2' since the scraper 5 does not contact the surface 2' at an acute angle.

Figure 6:
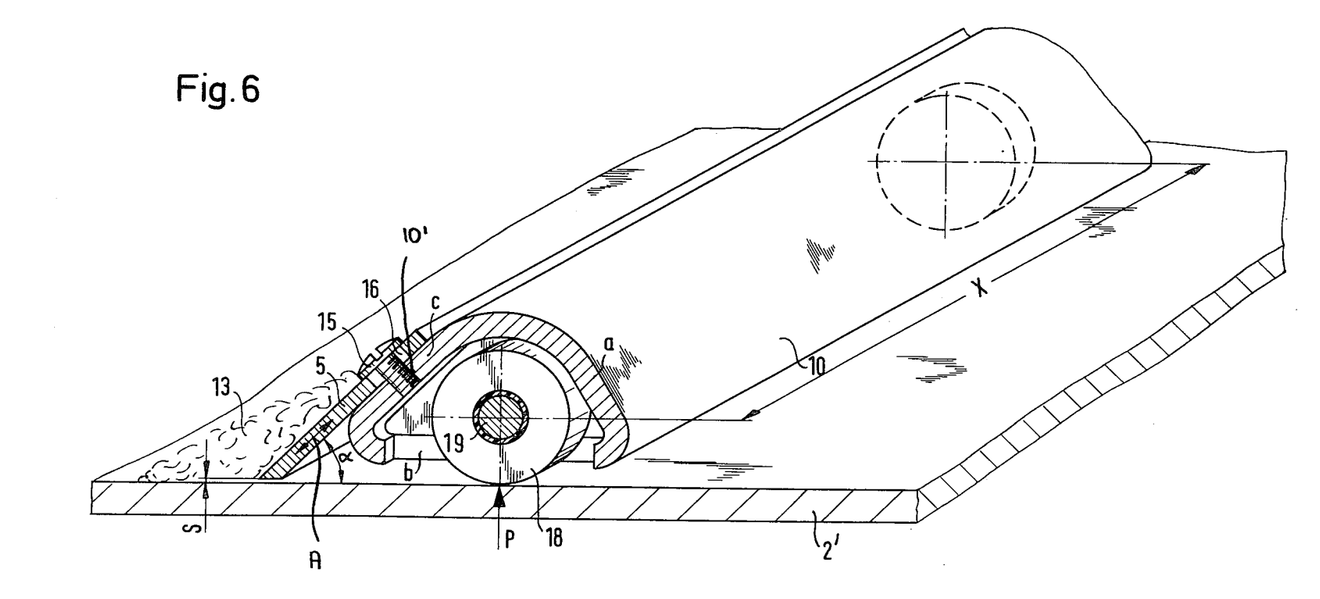
FIGS. 6, 8 and 10 illustrate perspective views partly in cross section of three different embodiments of the scraper and mounting arm assembly.
Figure 8:
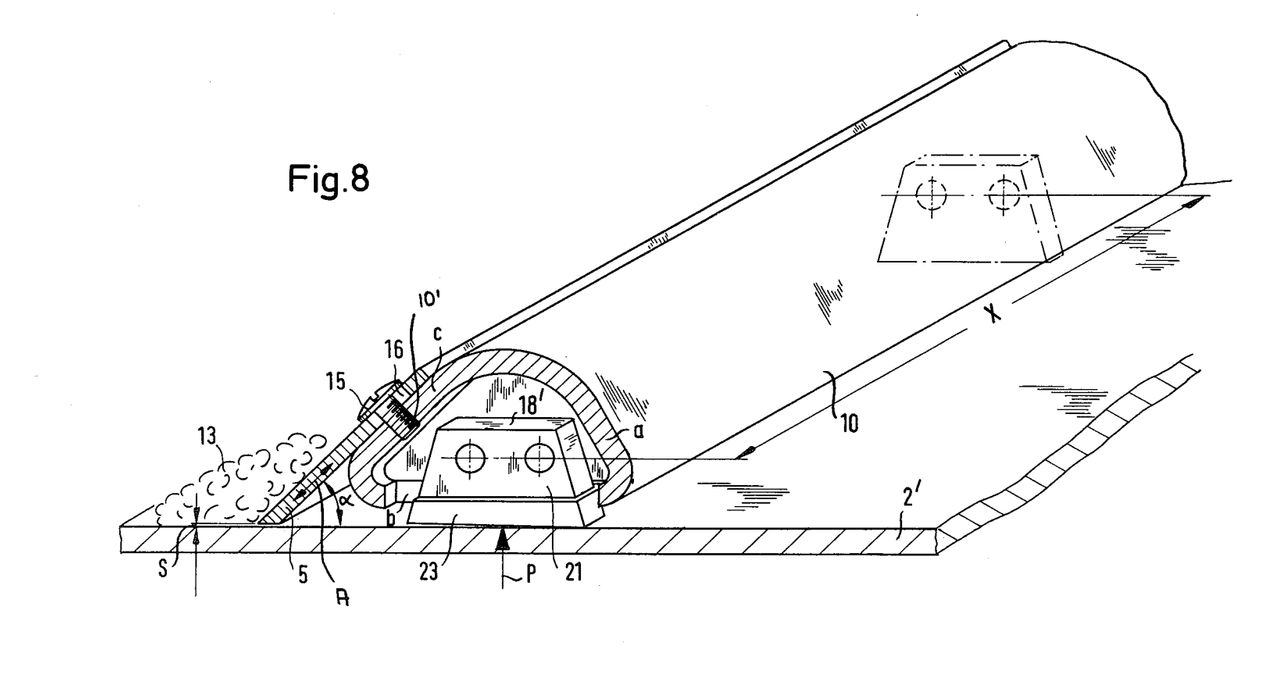
Figure 10:
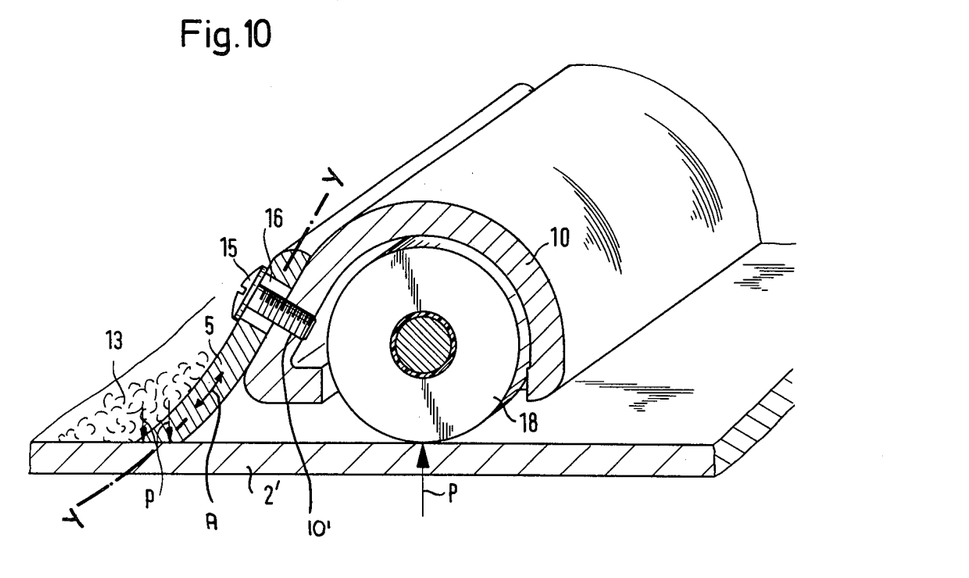

In the embodiment illustrated in FIGS. 6, 8 and 10, the scraper 5 is mounted to the supporting arm 10 to be adjustable along the direction indicated by the arrow A. The scraper 5 is mounted by means of any desired plurality of clamping screws 15. The clamping screws 15 engage in longitudinal slots 16 formed in the body of the scraper 5 and are threadly fastened with the supporting arm 10 through threaded bores 10' therein. The supporting arm 10 is in turn mounted in the bottom area of the cooker for rotation therein. The supporting arm 10 is preferably formed as a triangular profiled member having a leading side c, to which the scraper 5 is fastened, and sides a (trailing side), and b (underside). It has been found that the triangular profile affords an optimized degree of stability to the supporting arm 10 which substantially avoids the occurrence of vibrations during operation. The oblique position of side c corresponds to the desired angular setting α for the scraper 5.

In the embodiments shown in FIGS. 6 and 8, the height adjustment of the scraper 5 varies the height of the gap S.

Figure 7:
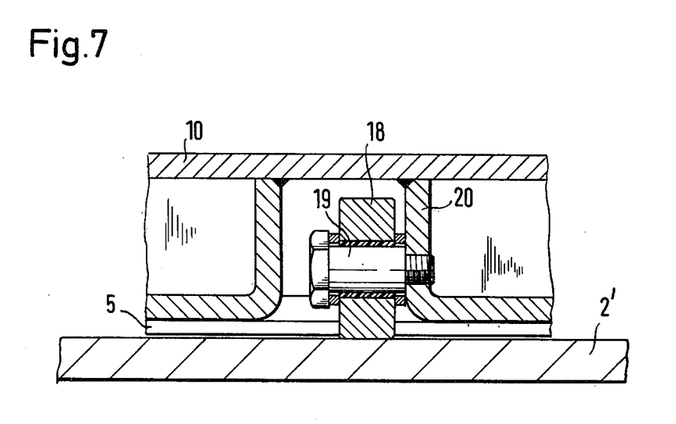
FIGS. 7 and 9 are partial cross-sectional views taken in the direction X of FIGS. 6 and 8, respectively, illustrating further details of the guiding elements for the scrapers.

At any desired intervals supporting elements 18 in the form of guide rollers or other suitable means are disposed along the underside of the supporting arm 10. These supporting elements 18 are supported to roll over the bottom surface 2' of the cooker 2 and serve therefore to guide the supporting arm 10 according to the state of the bottom surface 2'. Thus the desired and required parallelity between the bottom surface 2' and the scraper 5 is achieved and maintained. The irregularities which are present in the surface 2', due primarily to the effects of heating the surface 2', impart to the supporting elements 18 a force P. The forces imparted are absorbed by the supporting elements 18 and thus have no influence on the scraper 5. The rollers of the supporting elements 18 are mounted on shafts 19 which are mounted to a bar 20 (FIG. 7) fastened to the interior of the supporting arm 10.

Figure 9:
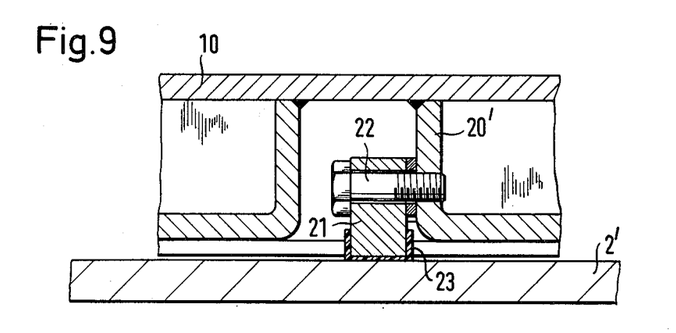

In the embodiment of FIG. 8 the supporting element 18' is configured as a slide shoe 21 resting on the bottom surface 2' of the cooker 2. The slide shoe 21 is also removably mounted by means of the screw elements 22 to a bar 20' fastened within the interior of the supporting arm 10 as shown in FIG. 9. The slide shoe 21 may be provided with a slide layer or coating of a material with good sliding properties. The slide surface for the slide shoe 21 may also be formed of a slide sleeve 23, as shown in FIGS. 8 and 9 which can be slipped over the slide shoe 21 so that it can easily be exchanged. The material for the slide layer or the slide sleeve 23 in the embodiment of FIGS. 8 and 9 can be, for example, polytetrafluoroethylene, known by the trademark TEFLON. Due to its high heat resistance and good sliding properties, Teflon is very well suited for this purpose.

As shown in FIG. 10, it is advisable to flexibly mount the scraper 5 to the supporting arm 10, that is, so that the scraper 5 is biased in a bending mode against the surface 2'. A biasing force p is developed between the scraper 5 and the surface 2'. The force p is substantially constant. As a result of the configuration and arrangement of the scraper 5 shown in FIG. 10, even the slightest unevennesses in the bottom surface 2' of the cooker 2 are passed over without play when the supporting arm 10 rotates. Also, the forces P are here absorbed by the supporting elements 18. As stated above, the scraper 5 may be made of plastic in addition to the known metals.

Figure 11:
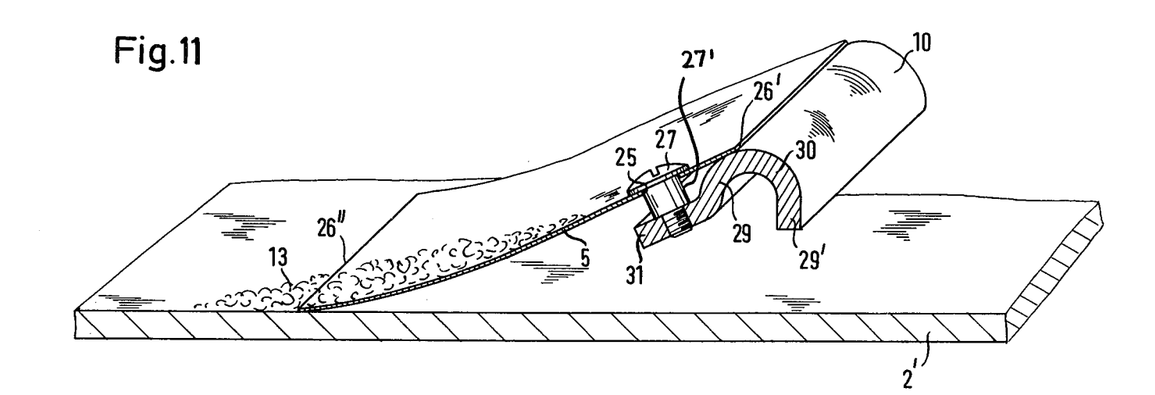
FIG. 11 illustrates in perspective a further embodiment of the scraper and supporting arm therefore.

Between the scraping edge 26'' which rests on the heated bottom surface 2' of the cooker 2, as shown in FIG. 11, and the upper edge 26' of the scraper 5 which rests on the supporting arm 10, there is a temperature drop of approximately 100°C. This temperature drop produces considerable internal stresses in the scraper 5 which must be compensated for in some manner in order to avoid deformation of the scraper 5. In order to prevent this deformation it is advisable to mount the scraper 5 on the supporting arm 10 in a thermoelastic manner. That is, in such a manner that the scraper 5 can freely expand in the direction of its axis X so that the stresses occuring in the scraper are compensated.

A deformation or warping of the scraper 5 is thus prevented.

The thermoelastic mounting of the scraper 5 on the supporting arm 10 is effected by forming in each scraper 5 a fitted bore 25 at approximately one-half the longitudinal length of each scraper 5. A collar screw 27 is inserted through the fitted bore 25 for fastening and centering the scraper 5 on the supporting arm 10. At both sides of the fitted bore 25 longitudinal slots 28 are formed preferably at defined spacings to one another in the scraper 5. Collar screws 27 also inserted through these longitudinal slots for the purpose of arresting the scraper 5 in the longitudinal direction. Although the collar screws 27 are preferably configured as shown in FIG. 11 with an integral collar 27', it should be understood that the collar portion can be a separate element, such as for example, a bushing.

Figure 12:
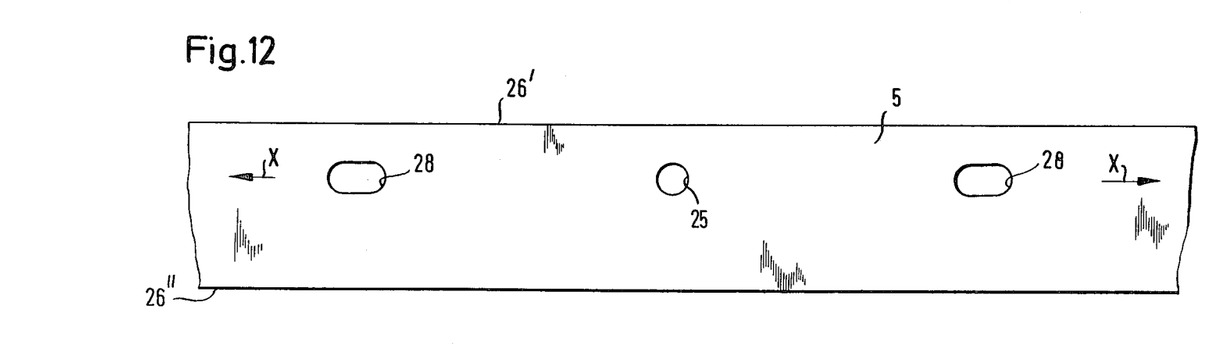
FIG. 12 is a plan view of one embodiment of a scraper according to the present invention.

With the arrangement of the fitted bore 25 at half the length of the scraper, accurate centering and mounting of the scraper 5 is obtained on the supporting arm 10 during operation. The arrangement of the longitudinal slots 28 has the advantage that the scraper 5 can move unhampered in the longitudinal direction of these slots, indicated by the arrows X in FIG. 12. Relative movement occurs, therefore, between the slots 28 and the screws 27 which extend therethrough. The screws 27, therefore, serve as stops for the expansion of the scraper 5 in the X direction. Thus the stresses occurring within the scraper 5 can be compensated since the scraper 5 can freely expand from the fitted bore 25 in the X direction.

One preferred embodiment of the present invention shown in FIG. 11 for effectively avoiding thermal deformations of the scraper 5, advisably disposes the scraper 5 on the back 30 of the supporting arm 10 only with the region of its upper edge 26'. For this purpose the supporting arm 10 has an approximately U-shaped cross-sectional portion. One arm 29 of the cross-sectional portion is therefore made somewhat shorter than the other arm 29'. From the arm 29 a flange portion 31 laterally extends. The flange portion 31 is arranged to be parallel to the scraper 5 at a distance corresponding to the collar of the collar screw 27. The collar screws 27 which are provided for holding the scraper 5 on the supporting arm elastic guidance of the scraper 5 is obtained.

Figure 13:
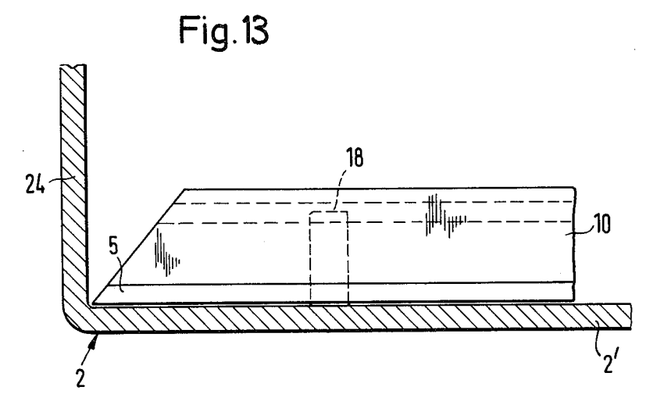
FIGS. 13 and 14 illustrate in elevation and plan, respectively, the supporting arm guiding the scraper relative to the vertical wall of the cooker.
Figure 14:
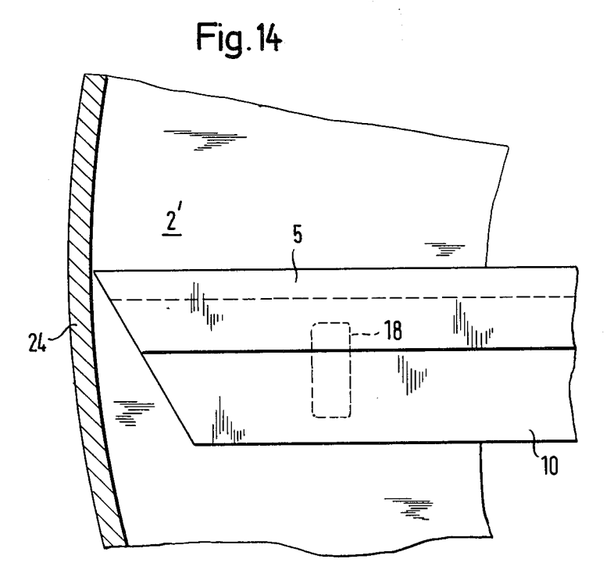

As already mentioned any formation of a gap between the supporting arm 10 or the scraper 5 and the vertical wall 24 of the cooker 2 should be avoided. For this reason, the supporting arm 10 or the scraper 5 is angled or slanted with respect to the vertical wall 24, as shown in FIGS. 13 and 14.

It will be understood that the above description of the present invention is susceptible to various modifications, changes and adaptations, and the same are intended to be comprehended within the meaning and range of equivalents of the appended claims.

We claim:

1. In a cooking appliance including a cooker for holding the ingredients to be cooked, the cooker having a bottom surface, means for heating the cooker, a stirring element for stirring the ingredients to be cooked, and means for driving the stirring element about a substantially vertical axis of the cooker, the improvement comprising in combination:

a. a post member disposed coextensively with said axis and extending to said bottom, said post member forming part of said means driving said stirring element, said post member being arranged for rotation about said axis;

b. two arms affixed to said post member and extending therefrom in opposite direction adjacent and parallel to said bottom, said arms forming part of said stirring element, each of said arms including, over its length, a first arm portion, a second arm portion adjoining end-to-end said first arm portion at a first angle and a third arm portion adjoining end-to-end said second arm portion at a second angle, in each arm one of said angles is an acute angle and the other of said angles is an obtuse angle, one of said angles in each arm being oriented in the direction of rotation of said post member, the other angle in each arm being oriented opposite the direction of rotation of said post member; and c. a scraper attached to and extending along each arm, said scraper forming part of said stirring element and cooperating with said bottom for scraping the same upon rotation of said post member.

2. A cooking appliance as defined in claim 1, wherein said acute angle is disposed radially outboard of said obtuse angle in each arm with respect to said axis.

3. A cooking appliance as defined in claim 1, wherein said acute angle in each arm has its apex in the direction of rotation of said post member.

4. In a cooking appliance including a cooker for holding the ingredients to be cooked, the cooker having a bottom surface, means for heating the cooker, a stirring element for stirring the ingredients to be cooked, and means for driving the stirring element about a substantially vertical axis of the cooker, the improvement comprising in combination:

a. a post member disposed coextensively with said axis and extending to said bottom, said post member forming part of said means driving said stirring element, said post member being arranged for rotation about said axis;

b. a supporting arm affixed to said post member and extending therefrom in opposite directions adjacent and parallel to said bottom, said arm forming part of said stirring element, said arm having a generally inverted U-shaped cross-sectional portion and a flange portion extending outwardly from one side of said cross-sectional portion;

c. a scraper extending along said arm, said scraper cooperating with said bottom for scraping the same upon rotation of said post member, said scraper having an upper edge region being in engagement with said U-shaped portion; and d. fastening means mounting said scraper on said supporting arm, said flange portion of said supporting arm extending in spaced parallel relation with a mounted part of said scraper, said mounted part adjoining said upper edge region.

5. A cooking appliance as defined in claim 4, wherein said fastening means comprise a plurality of collar screws engaging said flange portion of said supporting arm.

6. In a cooking appliance including a cooker for holding the ingredients to be cooked, the cooker having a bottom surface, means for heating the cooker, a stirring element for stirring the ingredients to be cooked, and means for driving the stirring element about a substantially vertical axis of the cooker, the improvement comprising in combination:

a. a post member disposed coextensively with said axis and extending to said bottom, said post member forming part of said means driving said stirring element, said post member being arranged for rotation about said axis;

b. a supporting arm affixed to said post member and extending therefrom the opposite directions adjacent and parallel to said bottom, said arm forming part of said stirring element, said arm having a generally triangular profile being open towards said bottom and having a leading side, a trailing side and an open underside, said triangular profile defining an inner space extending within and along the length dimension of said arm;

c. a support roller mounted for rotation within said inner space, said support roller being in engagement with said bottom to roll therealong upon rotation of said post member;

d. a scraper engaging and extending along said leading side of said triangular profile of said arm, said scraper cooperating with said bottom for scraping the same upon rotation of said post member; and e. fastening means securing said scraper to said supporting arm.

7. In a cooking appliance as defined in claim 6, wherein said fastening means includes adjusting means arranged for affixing said scraper to said supporting arm at an arbitrary distance from said bottom.

8. In a cooking appliance including a cooker for holding the ingredients to be cooked, the cooker having a bottom surface, means for heating the cooker, a stirring element for stirring the ingredients to be cooked, and means for driving the stirring element about a substantially vertical axis of the cooker, the improvement comprising in combination:

a. a post member disposed coextensively with said axis and extending to said bottom, said post member forming part of said means driving said stirring element, said post member being arranged for rotation about said axis;

b. a supporting arm affixed to said post member and extending therefrom in opposite directions adjacent and parallel to said bottom, said arm forming part of said stirring element;

c. at least one slide shoe secured to said supporting arm and being provided with a slide coating, said slide shoe guiding said supporting arm on the bottom surface of the cooker;

d. a scraper extending along said arm, said scraper cooperating with said bottom for scraping the same upon rotation of said post member; and e. fastening and adjusting means securing said scraper to said supporting arm, said fastening and adjusting means being arranged for affixing said scraper to said supporting arm at an arbitrary distance from said bottom.

9. A cooking appliance as defined in claim 8, wherein said supporting arm is formed as a member having a triangular profile.

10. In a cooking appliance including a cooker for holding the ingredients to be cooked, the cooker having a bottom surface, means for heating the cooker, a stirring element for stirring the ingredients to be cooked, and means for driving the stirring element about a substantially vertical axis of the cooker, the improvement comprising in combination:

a. a post member disposed coextensively with said axis and extending to said bottom, said post member forming part of said means driving said stirring element, said post member being arranged for rotation about said axis;
b. a supporting arm affixed to said post member and extending therefrom in opposite directions adjacent and parallel to said bottom, said arm forming part of said stirring element;
c. at least one slide shoe secured to said supporting arm and being provided with an exchangeable slide sleeve which is slipped over said slide shoe, said slide shoe guiding said supporting arm on the bottom surface of the cooker;
d. a scraper extending along said arm, said scraper cooperating with said bottom for scraping the same upon rotation of said post member; and
e. fastening and adjusting means securing said scraper to said supporting arm, said fastening and adjusting means being arranged for affixing said scraper to said supporting arm at an arbitrary distance from said bottom.

\* \* \* \* \*